US008145269B2

United States Patent
Shin et al.

(10) Patent No.: US 8,145,269 B2
(45) Date of Patent: *Mar. 27, 2012

(54) MOBILE TERMINAL AND METHOD FOR DISPLAYING MENU ON THE SAME

(75) Inventors: Jong-Geun Shin, Gyeonggi-Do (KR); Jin-Woo Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 403 days.

This patent is subject to a terminal disclaimer.

(21) Appl. No.: 12/434,256

(22) Filed: May 1, 2009

(65) Prior Publication Data

US 2009/0280863 A1 Nov. 12, 2009

(30) Foreign Application Priority Data

May 6, 2008 (KR) .................. 10-2008-0042022

(51) Int. Cl.
*H04B 1/38* (2006.01)
*G06F 3/00* (2006.01)

(52) U.S. Cl. ....... 455/557; 455/74.1; 715/718; 345/173; 345/902

(58) Field of Classification Search .......... 455/74.1, 455/88, 419, 557–559; 345/902
See application file for complete search history.

(56) References Cited

U.S. PATENT DOCUMENTS

| 5,335,276 A * | 8/1994 | Thompson et al. ........... 380/266 |
| 7,478,187 B2 * | 1/2009 | Knepper et al. ............. 710/300 |
| 7,478,333 B2 * | 1/2009 | Shah et al. ................. 715/753 |
| 2005/0073522 A1 * | 4/2005 | Aholainen et al. .......... 345/440 |
| 2006/0109240 A1 * | 5/2006 | Fu et al. .................... 345/156 |
| 2007/0123194 A1 * | 5/2007 | Karaoguz et al. ........... 455/403 |
| 2009/0191854 A1 * | 7/2009 | Beason ...................... 455/418 |

FOREIGN PATENT DOCUMENTS

| KR | 10-2001-0019664 | 3/2001 |
| KR | 10-2005-005684 | 1/2005 |
| KR | 10-2005-0102098 | 10/2005 |
| KR | 10-0538623. | 12/2005 |
| KR | 2007109673 A * | 11/2007 |

* cited by examiner

*Primary Examiner* — Howard Williams
(74) *Attorney, Agent, or Firm* — Lee, Hong, Degerman, Kang & Waimey

(57) ABSTRACT

A mobile terminal configured to couple with a user-removable interface module includes a connector configured to couple or otherwise contact the removable interface module, a controller configured to determine whether a coupling exists between the mobile terminal and the removable interface module, and a touchscreen display configured to display the first group of icons responsive to the determining that the coupling does not exist and display the second group of icons responsive to the determining that the coupling exists, wherein each of the first group of icons relates to a function that is associated with the mobile terminal and which are each controllable responsive to user input to the touchscreen display, and wherein each of the second group of icons relates to a function of the mobile terminal that is associated with the removable interface module and which are each controllable responsive to user input to the touchscreen display.

24 Claims, 17 Drawing Sheets

MOBILE TERMINAL AND METHOD FOR DISPLAYING MENU ON THE SAME

CROSS REFERENCE TO RELATED APPLICATIONS

Pursuant to 35 U.S.C. §119(a), this application claims the benefit of earlier filing date and right of priority to Korean Application No. 10-2008-0042022, filed on May 6, 2008, the contents of which are hereby incorporated by reference herein in their entirety.

FIELD OF THE INVENTION

The present invention relates to a mobile terminal to which an external removable module can be coupled. The present invention further relates to displaying items on the mobile terminal according to the coupled external module.

DISCUSSION OF THE RELATED ART

A mobile terminal is a portable device having one or more functions such as voice and video communications, inputting/outputting information, storing data, and the like. Various functions of the mobile terminal also include functions such as capturing images and video via a camera, playing music files or video, playing games, receiving broadcasts, and the like. Accordingly, some mobile terminals are implemented in the form of comprehensive multimedia players.

Efforts are ongoing to support and increase the complicated functions of the multimedia players, in terms of hardware or software. For example, a user interface (UI) environment is provided to allow users to easily and conveniently search or select functions.

Also, as users consider their mobile terminal to be a personal portable device that may express their personality, mobile terminals are provided in various designs. In terms of design, a folder type, slide type, bar type, or rotation type design may be applied for mobile terminals.

For users to conveniently carry around, small and light mobile terminals are manufactured, thus possibly limiting hardware and/or software resources in implementing functions or performance of the mobile terminals. Thus, in order to overcome the limitation of the resources and extend the functions and performance, the mobile terminals, are developed to have various accessory modules that can be coupled to the mobile terminal.

SUMMARY OF THE INVENTION

In accordance with one embodiment, a method for displaying items on a mobile terminal includes determining whether a coupling exists between the mobile terminal and a user-removable interface module, displaying a first group of icons on a touchscreen display of the mobile terminal when the coupling does not exist, wherein each of the first group of icons relates to a function that is associated with the mobile terminal and which are each controllable responsive to user input to the touchscreen display, and displaying a second group of icons on the touchscreen display of the mobile terminal when the coupling exists, wherein each of the second group of icons relates to a function of the mobile terminal that is associated with the removable interface module and which are each controllable responsive to user input to the touchscreen display.

In accordance with one embodiment, a mobile terminal configured to couple with a user-removable interface module includes a connector configured to contact the removable interface module, a controller configured to determine whether a coupling exists between the mobile terminal and the removable interface module via the connector and display a first group of icons or a second group of icons based upon a status of the coupling, and a touchscreen display configured to display the first group of icons responsive to the determining that the coupling does not exist and display the second group of icons responsive to the determining that the coupling exists, wherein each of the first group of icons relates to a function that is associated with the mobile terminal and which are each controllable responsive to user input to the touchscreen display, and wherein each of the second group of icons relates to a function of the mobile terminal that is associated with the removable interface module and which are each controllable responsive to user input to the touchscreen display.

In accordance with one embodiment, a method for displaying at least one item on a mobile terminal includes determining whether a coupling exists between the mobile terminal and a user-removable interface module, determining a type of the coupled removable interface module upon determining that the coupling exists, and displaying the at least one item on the touchscreen display of the mobile terminal responsive to the determined type of the coupled removable interface module, wherein the at least one item relates to at least one function of the mobile terminal that is associated with the type of the coupled removable interface module, wherein the displayed at least one item is different for different types of removable interface modules.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal may be implemented in various forms. For example, a mobile terminal according to an embodiment of the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like.

Figure 1:
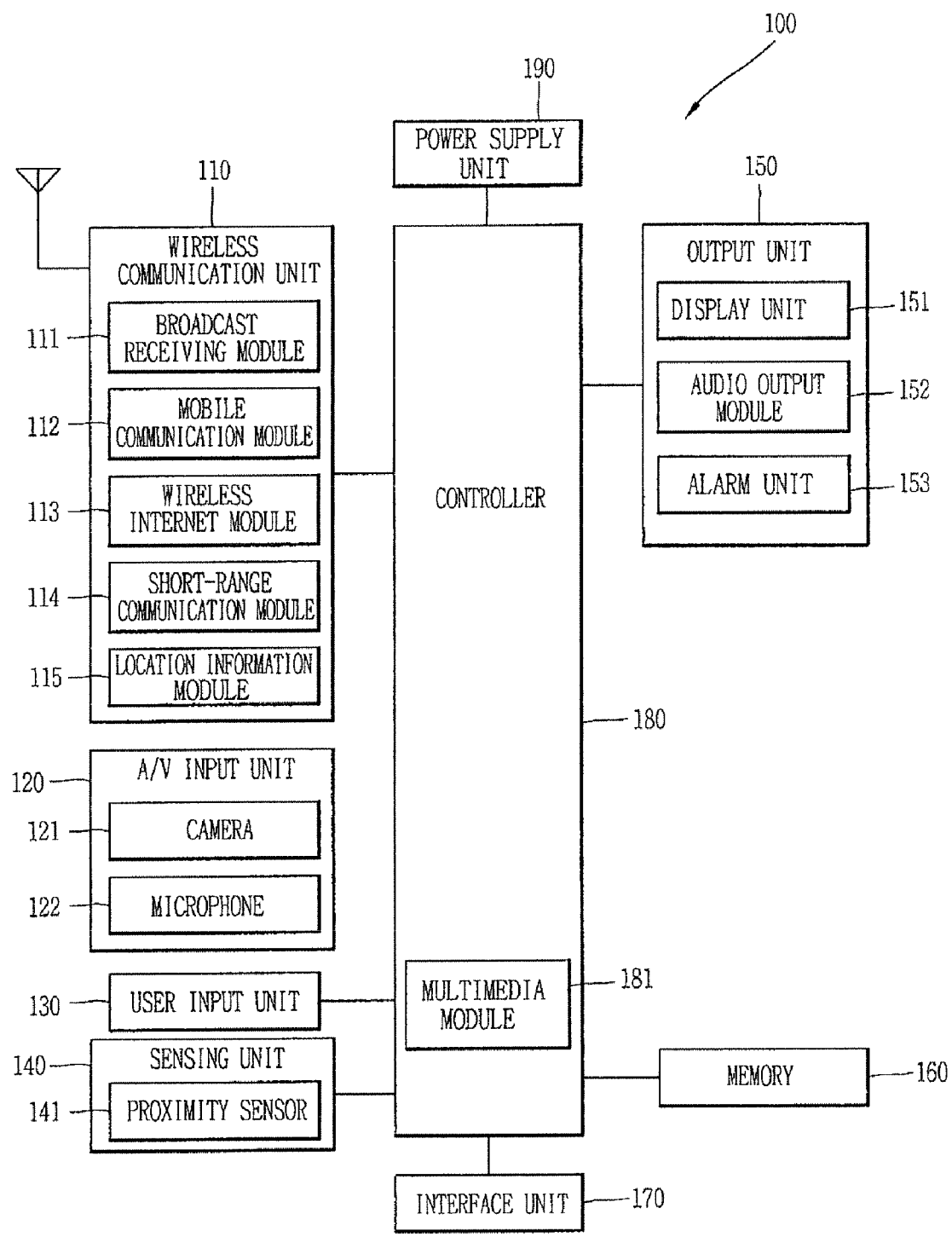
FIG. 1 is a schematic block diagram of a mobile terminal according to an embodiment of the present invention.

Referring to FIG. 1, the mobile terminal 100 according to an embodiment of the present invention includes a wireless communication unit 110, an A/V (Audio/Video) input unit 120, a user input unit 130, a sensing unit 140, an output unit 150, a memory 160, an interface unit 170, a controller 180, and a power supply unit 190, and the like. While the mobile terminal 100 shown in FIG. 1 has various components, it should be understood that implementing all of the illustrated components is not a requirement, and more or fewer components may alternatively be implemented.

The elements of the mobile terminal 100 will be described in detail as follows. The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server or other network entity via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive broadcast signals by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), and the like. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 or anther type of storage medium.

The mobile communication module 112 transmits and/or receives radio signals to and/or from at least one of a base station, such as access point, Node B, and the like, an external terminal, such as other user devices, and a server or other network entities. Such radio signals may include a voice call signal, a video call signal or various types of data according to text and/or multimedia message transmission and/or reception.

The wireless Internet module 113 supports wireless Internet access for the mobile terminal 100. This wireless Internet module 113 may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location or position of the mobile terminal 100. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal 100 according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

The A/V input unit 120 is configured to receive an audio or video signal. The A/V input unit 120 may include a camera 121 or other image capture device and a microphone 122 or other sound pick-up device. The camera 121 processes image data of still pictures or video obtained by an image capture device in a video capturing mode or an image capturing mode. The processed image frames may be displayed on a display unit 151 or other visual output device.

The image frames processed by the camera 121 may be stored in the memory 160 or other storage medium, or transmitted via the wireless communication unit 110. Two or more cameras 121 may be provided according to the configuration of the mobile terminal 100.

The microphone 122 may receive sounds or audible data via a microphone or the like in a phone call mode, a recording mode, a voice recognition mode, and the like, and can process such sounds into audio data. The processed audio data such as voice may be converted for output into a format transmittable to a mobile communication base station or other network entity via the mobile communication module 112 in the case of the phone call mode. The microphone 122 may implement various types of noise canceling or suppression algorithms to cancel or suppress noise or interference generated in the course of receiving and transmitting audio signals.

The user input unit 130 or other user input device may generate key input data from commands entered by a user to control various operations of the mobile terminal 100. The user input unit 130 allows the user to enter various types of information, and may include a keypad, a dome switch, a touch pad, for example, a touch sensitive member that detects changes in resistance, pressure, capacitance, or the like due to being contacted, a jog wheel, a jog switch, and the like. In particular, when the touch pad is overlaid on the display unit 151 in a layered manner, it may form a touch screen.

The sensing unit 140 or other detection means detects a current status or state of the mobile terminal 100 such as an opened or closed state of the mobile terminal 100, a location of the mobile terminal 100, the presence or absence of touch inputs or user contact with the mobile terminal 100, the orientation of the mobile terminal 100, an acceleration or deceleration movement and direction of the mobile terminal 100, and the like, and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141, which will be described in association with the touch screen.

The interface unit 170 or other connection means serves as an interface by which at least one external device may be connected with the mobile terminal 100. For example, the external devices may include wired or wireless headset ports, an external power supply or battery charger ports, wired or wireless data ports, memory card ports, ports for connecting a device having an identification module, audio input/output (I/O) ports, video I/O ports, earphone ports, or the like.

The identification module may be a memory chip or other element with memory or storage capabilities that stores various information for authenticating user's authority for using the mobile terminal 100 and may include a user identity module (UIM), a subscriber identity module (SIM), a universal subscriber identity module (USIM), and the like. In addition, the device having the identification module (referred to as the 'identifying device', hereinafter) may take the form of a smart card. Accordingly, the identifying device may be connected with the mobile terminal 100 via a port or other connection means.

The interface unit 170 may be used to receive inputs, such as data, information, power, and the like, from an external device and transfer the received inputs to one or more elements within the mobile terminal 100 or may be used to transfer data between the mobile terminal and the external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal 100 is properly mounted on the cradle.

The output unit 150 is configured to provide outputs in a visual, audible, and/or tactile manner, for example, audio signal, video signal, alarm signal, vibration signal, and the like. The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication such as text messaging, multimedia file downloading, and the like. When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units or other display means according to its particular desired embodiment. For example, the mobile terminal 100 may include both an external display unit and an internal display unit. The touch screen may be configured to detect a touch input pressure as well as a touch input position and a touch input area.

The proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Examples of the proximity sensor 141 include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. The proximity sensor 141 has a considerably longer life span compared with a contact type sensor, and it can be utilized for various purposes.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer or stylus can be detected based on a change in a field according to the approach of the pointer. Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern, such as a proximity touch distance, a proximity touch speed, a proximity touch time, a proximity touch position, a proximity touch movement state, or the like, can be detected, and information corresponding to the detected proximity touch operation and the proximity touch pattern can be outputted to the touch screen.

The audio output module 152 may convert and output sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100, for example, a call signal reception sound, a message reception sound, and the like. The audio output module 152 may include a speaker, a buzzer, or other sound generating device.

The alarm unit 153 or other type of user notification means may provide outputs to inform about the occurrence of an event of the mobile terminal 100. Typical events may include call reception, message reception, key signal inputs, a touch input, and the like. In addition to audio or video outputs, the alarm unit 153 may provide outputs in a different manner to inform about the occurrence of an event. For example, the alarm unit 153 may provide an output in the form of vibrations or other tactile or sensible outputs. When a call, a message, or some other incoming communication is received, the alarm unit 153 may provide tactile outputs, such as vibrations, to inform the user thereof. Also, if a key signal is inputted, the alarm unit 153 may output vibration as a feedback with respect to the key signal input. By providing such tactile outputs, the user can recognize the occurrence of various events. Outputs informing about the occurrence of an event may be also provided via the display unit 151 or the audio output module 152.

The memory 160 or other storage means may store programs or the like used for the processing and controlling operations performed by the controller 180, or may temporarily store data, such as a phonebook, messages, still images, video, and the like, that have been outputted or which are to be outputted. In addition, the memory 160 may store data regarding various patterns of vibrations and audio signals to be outputted when a touch is applied to the touch screen.

The memory 160 may include at least one type of storage medium including a Flash memory, a hard disk, a multimedia card, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, a card-type memory such as SD or DX memory, and the like. Also, the mobile terminal 100 may cooperate with a network storage device that performs the storage function of the memory 160 over a network connection.

The controller 180 such as a microprocessor or the like typically controls the general operations of the mobile terminal 100. For example, the controller 180 performs controlling and processing associated with voice calls, data communications, video calls, and the like. In addition, the controller 180 may include a multimedia module 181 for reproducing or playing back multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images.

The power supply unit 190 receives external power via a power cable connection or internal power via a battery of the mobile terminal 100 and supplies appropriate power required for operating respective elements and components under the control of the controller 180. Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application or program written in any suitable programming language. The software codes may be stored in the memory 160 and executed by the controller 180.

So far, the mobile terminal 100 has been described from the perspective of its functions. Hereinafter, external elements of the mobile terminal 100 will be described from the perspective of their functions with reference to FIGS. 2 and 3. The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
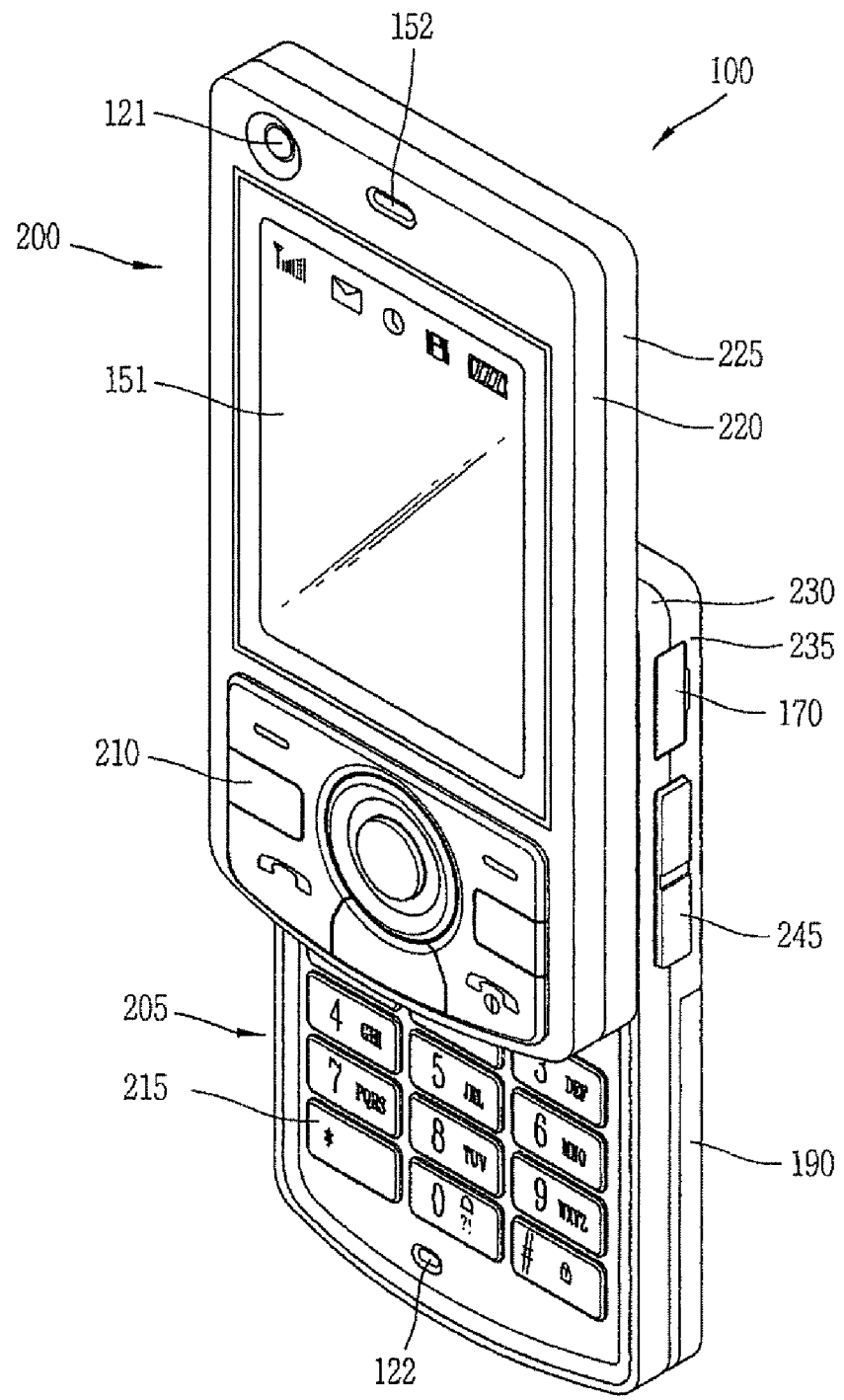
FIG. 2 is a front perspective view of a mobile terminal according to an embodiment of the present invention.

FIG. 2 is a front perspective view of the mobile terminal according to an embodiment of the present invention. Referring to FIG. 2, the mobile terminal 100 includes a first body 200 and a second body 205 that can be slidably moved along at least one direction with respect to the first body 200. In case of a folder type mobile phone, the mobile terminal 100 may include a first body and a second body having one side that can be folded or unfolded with respect to the first body.

A state in which the first body 200 is disposed to overlap with the second body 205 may be called a closed configuration, and as shown in FIG. 2, a state in which at least a portion of the second body 205 is exposed may be called an open configuration. The mobile terminal according to an embodiment of the present invention may be the folder type mobile terminal including the first body and the second body having one side to be folded or unfolded with respect to the first body. Here, a state in which the second body is folded may be called a closed configuration, and a state in which the second body is unfolded may be called an open configuration.

In addition, the mobile terminal according to an embodiment of the present invention may be a swing type mobile terminal including a first body and a second body configured to swing with respect to the first body. Here, a state in which the first body is disposed to overlap with the second body may be called a closed configuration, and a state in which the second body is swung to expose a portion of the first body may be called an open configuration.

In the closed configuration, the mobile terminal 100 mainly operates in a standby or idle mode, and the standby mode may be released upon user manipulation. The mobile terminal 100 is operated mainly in the calling mode or the like in the open configuration, and it can be changed to the standby mode with the lapse of time or upon user manipulation.

The case, such as a casing, housing, cover, or the like, constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225. The cases may be formed by injection-molding a synthetic resin or may be made of a metallic material such as stainless steel (STS), titanium (Ti), or the like.

The display unit 151, the audio output module 152, the camera 121 or the first user input unit 210 may be located at the first body 200, specifically, on the first front case 220 of the first body 200. The display unit 151 may include an LCD (Liquid Crystal Display), an OLED (Organic Light Emitting Diode), and the like that visually displays information.

A touch pad may be overlaid in a layered manner on the display unit 151 to allow the display unit 151 to function as a touch screen to input information via user's touch inputs. The audio output unit 152 may be implemented in the form of a speaker or other sound producing device. The camera 121 may be implemented to be suitable for capturing images or video with respect to the user and other objects.

Like the first body 200, the case constituting the external appearance of the second body 205 may include a second front case 230 and a second rear case 235. A second user input unit 215 may be disposed at the second body 205, specifically, at a front face of the second front case 230. A third user input unit 245, the microphone 122, and the interface unit 170 may be disposed on at least one of the second front case 230 and the second rear case 235.

The first to third user input units 210, 215 and 245 may be generally referred to as the user input units 130 or a manipulating portion, and various methods and techniques can be employed for the manipulating portion so long as they can be operated by the user in a tactile manner. For example, the user input units 130 can be implemented as dome switches or touch pad regions that can receive user commands or information according to the user's touch operations, such as pressing, pushing, swiping, drag-and-drop, or the like, or may be implemented in the form of a rotatable control wheel or disc, keys or buttons, a jog dial, a joystick, or the like.

In terms of their functions, the first user input unit 210 is used for inputting or entering commands such as start, end, scroll or the like, and the second user input unit 215 is used for inputting or entering numbers, characters, symbols, or the like. The first user input unit 210 may include a soft key used by interworking with icons displayed on the display unit 151 and navigation key, for example, including four direction keys and a central key for indicating and checking directions. The third user input unit 245 may support the so-called hot key functions that allow more convenient activation of particular functions for the mobile terminal.

The microphone 122 or other sound pick-up device may be appropriately implemented to detect user voice inputs, other sounds, and the like. The interface unit 170 may be used as a communication link, passage, path, or the like through which the terminal can exchange data or the like with an external device. For example, the interface unit 170 may be implemented in the form of a connection port for connecting an earphone to the mobile terminal 100 via a fixed or wireless means, power supply ports for providing power to the mobile terminal, a port for short-range communications, such as an Infrared Data Association (IrDA) port, a Bluetooth™ port, and a wireless LAN port, or the like. Further, the interface unit 170 may be a card socket for accommodating a SIM (Subscriber Identification Module) card or a UIM (User Identity Module) card, or an external card such as a memory card for storing information.

The power supply unit 190 for supplying power to the mobile terminal 100 may be located at the second rear case 235. The power supply unit 190 may be, for example, a rechargeable battery that can be detached.

Figure 3:
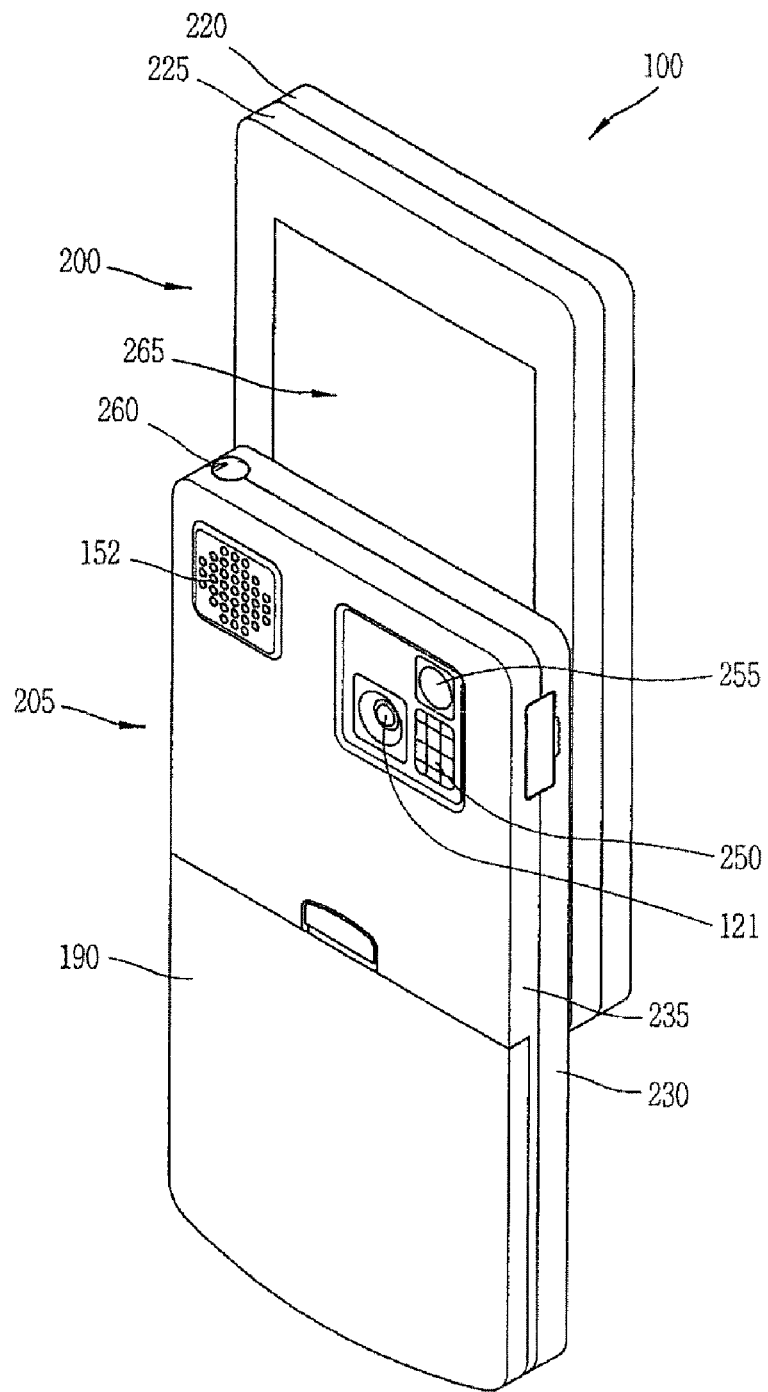
FIG. 3 is a rear perspective view of the mobile terminal according to an embodiment of the present invention.

FIG. 3 is a rear perspective view of the mobile terminal 100 of FIG. 2 according to an embodiment of the present invention. Referring to FIG. 3, a camera 121 or other image pick-up device may additionally be disposed on a rear surface of the second rear case 235 of the second body 205. The camera 121 of the second body 205 may have an image capture direction which is substantially opposite to that of the camera 121 of the first body 200 such that the two cameras face towards opposing directions, such as front and rear. Further, the camera 121 of the second body 205 may support a different resolution than the camera 121 of the first body 200 such that the images captured by the cameras of the first and second bodies have different numbers of pixels.

For example, the camera 121 of the first body 200 may operate with a relatively lower resolution to capture an image of the user's face and immediately transmit such image to another party in real-time during video call communication or the like in which reverse link bandwidth capabilities may be limited. The camera 121 of the second body 205 may operate with a relatively higher resolution to capture images of general objects with high picture quality, which may not require immediate transmission in real-time, but may be stored for later viewing or use.

Additional camera related components, such as a flash 250 and a mirror 255, may be disposed adjacent to the camera 121.

When an image of the subject is captured with the camera 121 of the second body 205, the flash 250 illuminates the subject. The mirror 255 allows the user to see a self image when capturing the self image by using the camera 121 of the second body 205.

The second rear case 235 may further include an audio output module 152. The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed externally or internally at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200. The other part of the slide module 265 may be disposed on the second front case 230 of the second body 205, which may not be exposed as shown in the drawing.

The second camera 121 and other components may be disposed on the second body 205, but such configuration is not meant to be limited. For example, one or more of the elements 260, 121, 250, 152 and the like, which are disposed on the second rear case 235 may be mounted on the first body 200, mainly, on the first rear case 225. In this case, those elements disposed on the first rear case 225 can be protected or covered by the second body 205 in the closed configuration. In addition, even if a separate camera is not provided at the second body 205, the camera module 121 may be configured to rotate or otherwise be moved to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Figure 4:
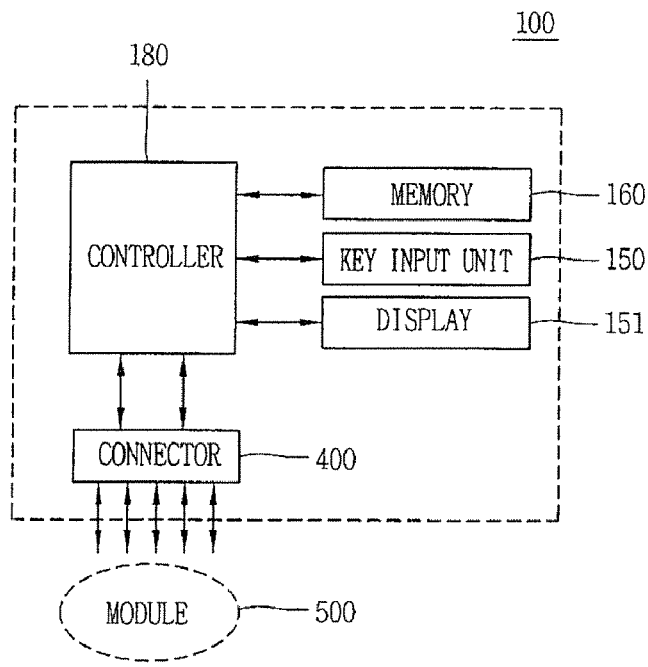
FIG. 4 is a schematic block diagram of a mobile terminal according to an embodiment of the present invention.

Various embodiments of the present invention will now be described with reference to the accompanying drawings. FIG. 4 is a schematic block diagram of the mobile terminal according to an embodiment of the present invention. Referring to FIG. 4, the mobile terminal 100 includes a coupling unit or a connector 400 for detecting whether an external removable module 500, such as a keyboard function extension module, a portable speaker module, a touch pad module, a display extension module, a radio transmitter module, a memory module, a game machine, a camera function extension module, and the like, is mounted and for recognizing functions of the mounted module. The mobile terminal 100 further includes an input unit 130 for receiving a user instruction such as a menu selection or external information, a controller 180 for configuring a menu for executing relevant functions of the module 500, a display unit 151 for outputting a menu screen image with arranged execution icons of the relevant functions when the menu is selected, and a memory 160 for storing execution information of the modules that can be mounted at the mobile terminal and information regarding a menu configuration.

Figure 5:
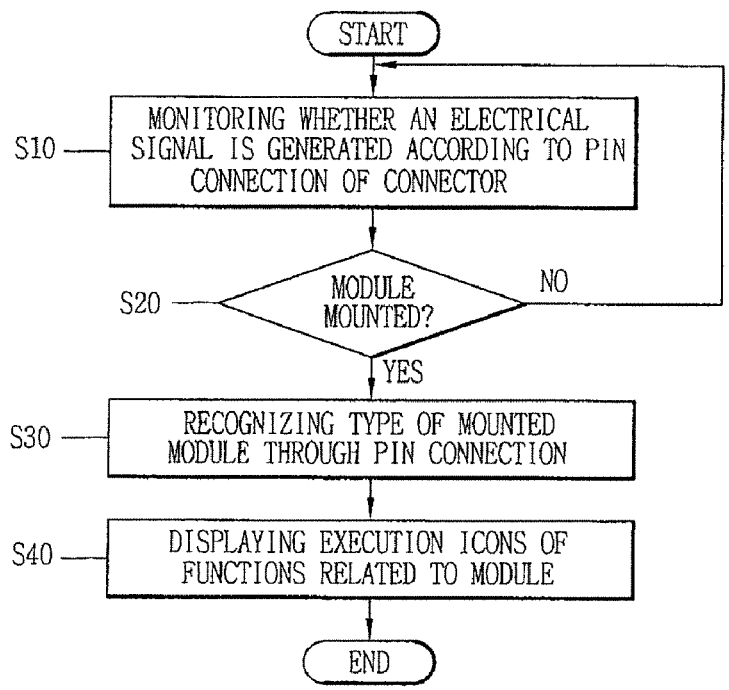
FIG. 5 is a flow chart illustrating managing a menu according to an embodiment of the present invention.

FIG. 5 is a flowchart illustrating managing a menu according to an embodiment of the present invention. When a module 500 for extending a function or performance is coupled to the mobile terminal 100, the mobile terminal displays functions related to the coupled module on a screen of the display unit 151. Thus, the user can conveniently execute the functions related to the corresponding module 500 no matter which module is coupled to the mobile terminal 100.

Referring to FIG. 5, the user selects one of the modules 500 that can be coupled to the mobile terminal 100 and couples the selected module to the mobile terminal. In the process of coupling the module 500 to the mobile terminal 100, the module and the mobile terminal are coupled via the connector 400.

As the connector 400, a general connector such as a 24-pin connector (input/output terminal connection standards) may be used, and any other connector may be used so long as it can be applicable for the mobile terminal 100. The connector 400 may be installed at any positions of the mobile terminal 100 where it can be conveniently connected with the module 500.

Once the module 500 is mounted or coupled (S10 and S20), the controller 180 of the mobile terminal 100 recognizes a type of the module mounted via the connector 400 (S30). If the mobile terminal 100 employs the 24-pinn input/output terminal as the connector 400, the controller 180 detects the position or the number of the pins connected via the connector 400 to recognize the type of the mounted module 500. Thereafter, the controller 180 displays executed icons of the functions related to the module 500 (S40).

In some embodiments, various modules 500 such as a keyboard function extension module, a portable speaker module, a touch pad module, a display extension module, and the like, may be mounted on the mobile terminal 100 via the connector 400.

Figure 6A:
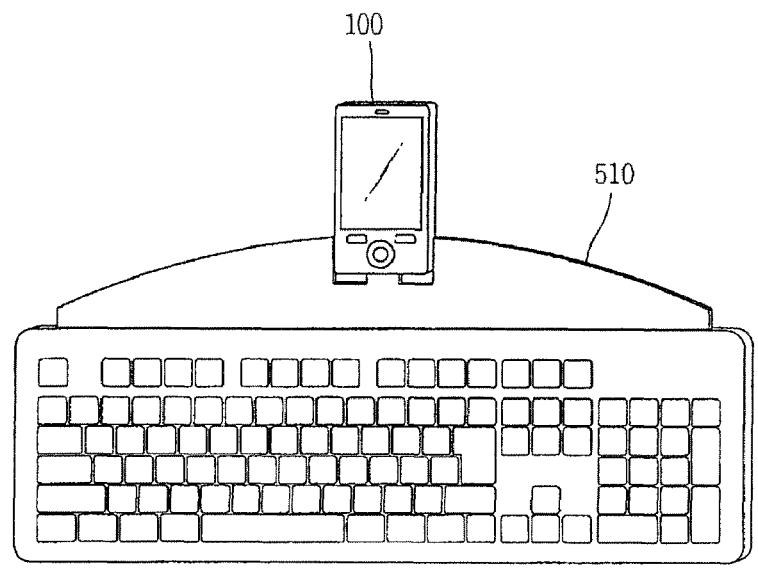
FIGS. 6A and 6B illustrate a mobile terminal with a keyboard function extension module mounted thereon according to an embodiment of the present invention.

FIG. 6A illustrates the keyboard function extension module mounted on the mobile terminal 100 according to an embodiment of the present invention. Referring to FIG. 6A, when an electrical signal is applied through connection of the connector 400, the controller 180 recognizes that module has been connected to the mobile terminal 100 and the connected module is the keyboard function extension module 510.

Figure 6B:
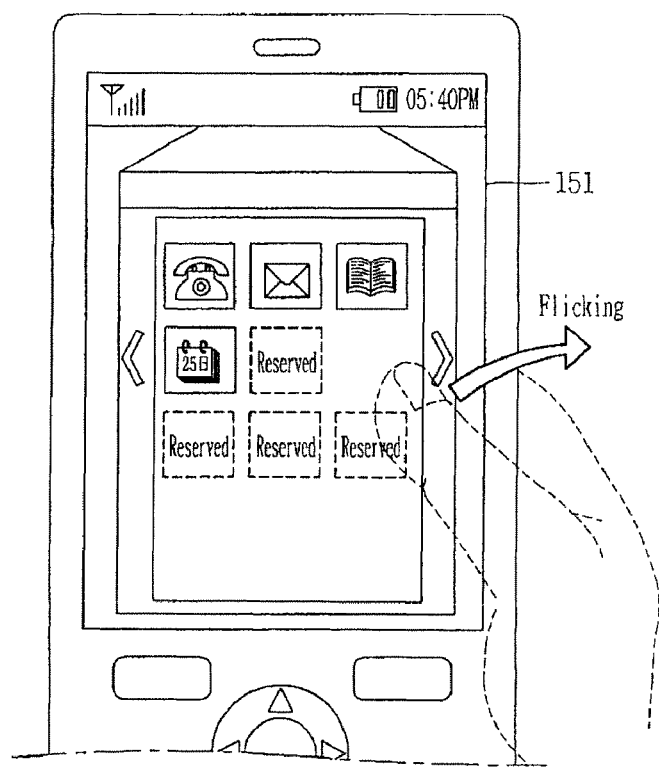
Figure 7A:
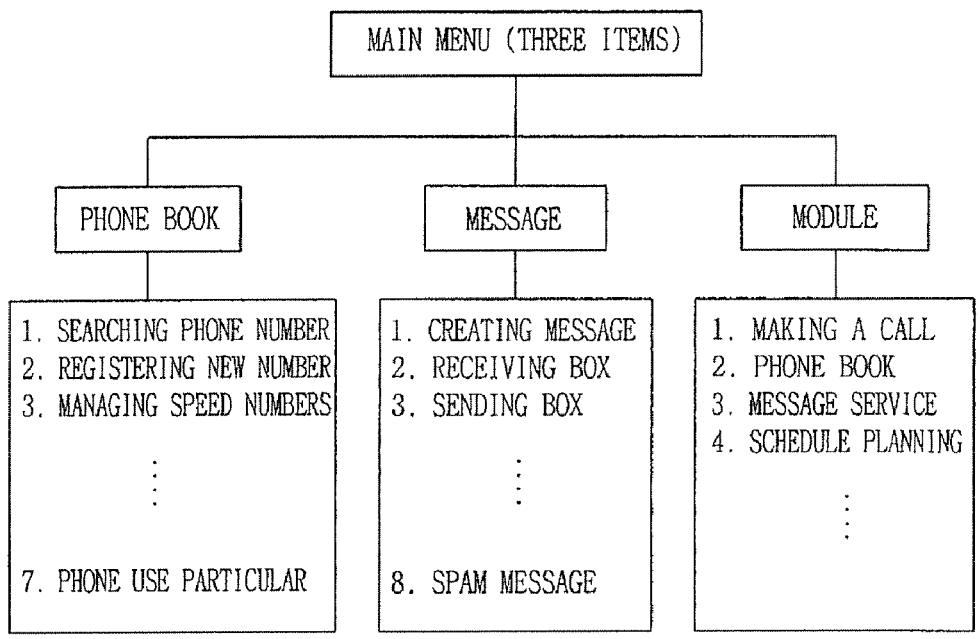
FIGS. 7A and 7B illustrate a user interface (UI) according to an embodiment of the preset invention.
Figure 7B:
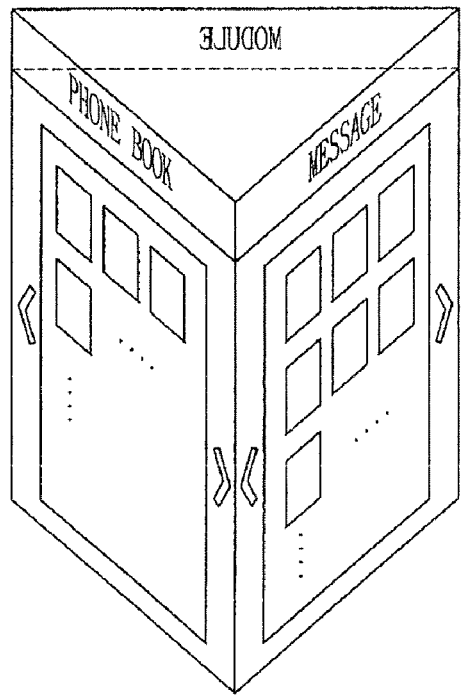

After the keyboard function extension module 510 is coupled and the type of the module is checked, the controller 180 displays a user interface (UI) on the display 151, as shown in FIG. 6B. For example, the UI is displayed in a shape of a triangular prism, and three menu items, including a phone book, a message, and a module, are displayed on the respective side surfaces of the triangular prism, as shown in FIGS. 7A and 7B.

When the coupled module is determined to be the keyboard function extension module 510, the controller 180 displays execution icons for functions requiring character inputting such as making a call, a phone book, a message service, schedule planning, and the like, as the menu items related to the keyboard function extension module 510, as shown in FIG. 6b. In this case, as for the arrangement order, preferably, the execution icons may be sequentially arranged according to their use frequency, starting from the most frequently used execution icon.

Figure 8:
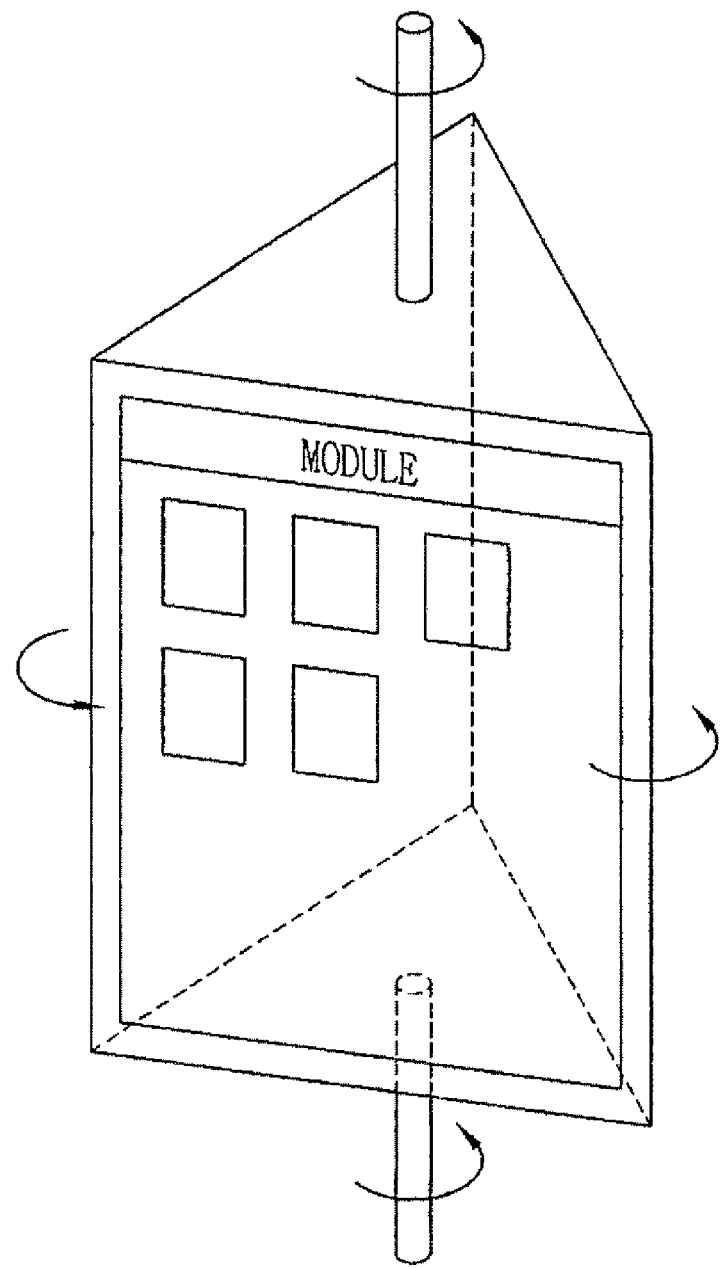
FIG. 8 illustrates an operation of the UI according to an embodiment of the present invention.

FIG. 8 illustrates an operation of the UI according to an embodiment of the present invention. Referring to FIG. 8, the UI allows moving a current menu to a next item or a previous item by flicking or inputting a particular key or a software button. The UI of the triangular prism, as shown in FIG. 8, is merely illustrative and the UI may be implemented in a square pillar, a pentagonal pillar or more polygonal pillars.

Figure 9A:
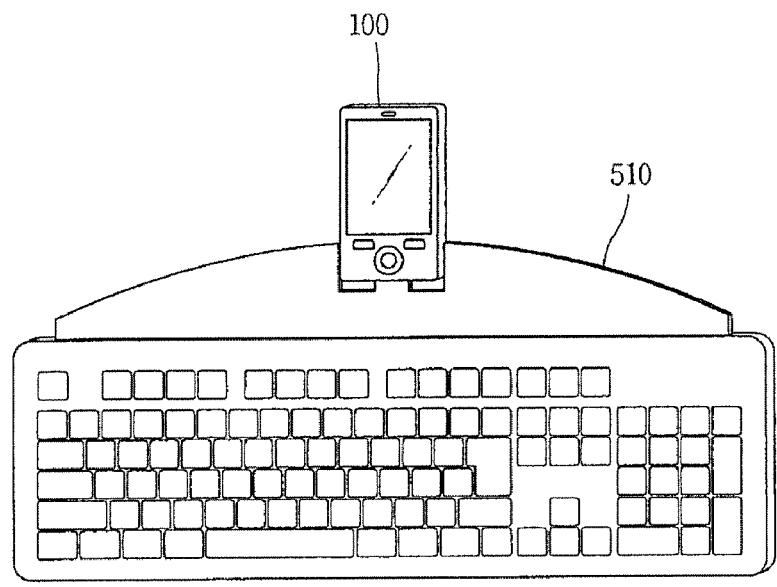
FIGS. 9A and 9B illustrate a mobile terminal with a keyboard function extension module mounted thereon according to an embodiment of the present invention, FIG. 9B illustrating a standby screen image of the mobile terminal.
Figure 9B:
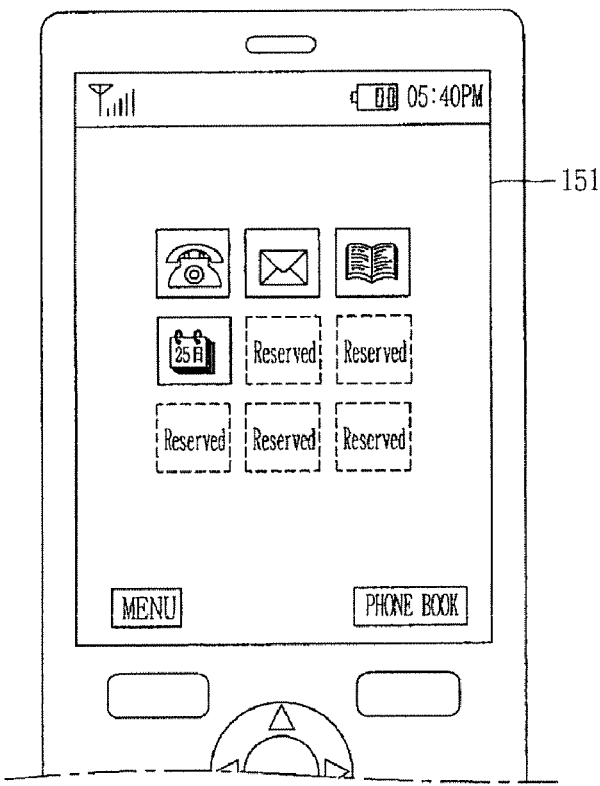

When the coupling of the module 510 is detected, the UI may be displayed or the execution icons for making a call, the phone book, the message service, schedule planning, and the like, as shown in FIG. 9B, may be disposed on the standby screen of the mobile terminal 100. By disposing the execution icons for the functions related to the coupled module 510 on the standby screen, the user convenience in using the mobile terminal 100 can be improved. FIG. 9A illustrates the mobile terminal 100 with the keyboard function extension module 510 mounted thereon, and FIG. 9B illustrates the standby screen image on the display 151 of the mobile terminal.

According to an embodiment of the present invention, before a module 500 is mounted on the mobile terminal 100, the menu items of the module 500 may include the execution icons for the basic menu or may be maintained in an inactive state. Alternatively, the menu items for the module 500 may remain empty in a reserved state. Preferably, the keyboard function extension module 510 employs a Qwerty keyboard that is similar to a computer keyboard.

Figure 10A:
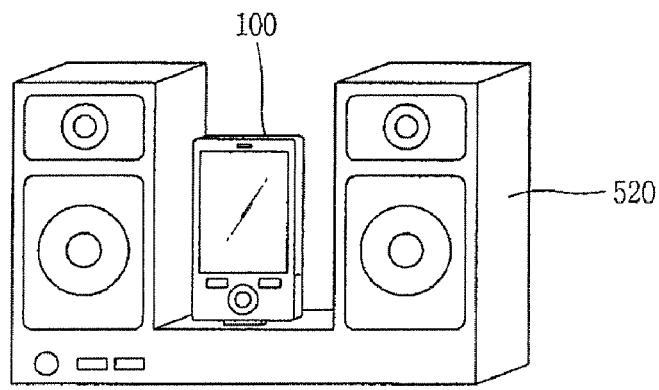
FIGS. 10A and 10B illustrate a mobile terminal with a portable speaker module mounted thereon according to an embodiment of the present invention.

FIG. 10A illustrates a mobile terminal 100 with a portable speaker module 520 mounted thereon. When an electrical signal is applied through a connection of the connector 400, the controller 180 recognizes that a module has been mounted on the mobile terminal 100 and the mounted module is the speaker module 520.

Figure 10B:
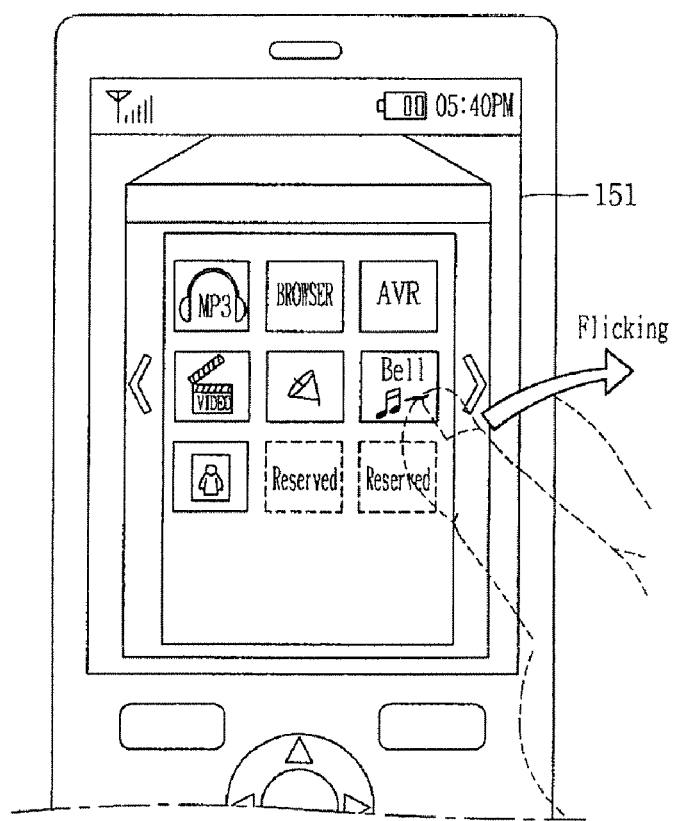

When the functions of the mounted speaker module 520 are confirmed, the controller 180 displays the UI of the triangular prism and displays execution icons for the functions that require audio input/output, such as audio play such as an MP3 function, a browser, voice recognition (AVR), video play, broadcast viewing, bell sound setting, video call, and the like, as the menu items of the speaker module 520, as shown in FIG. 10B. As for the arrangement order of the execution icons, preferably, the execution icons are sequentially arranged according to their use frequency, starting from the most frequently used execution icon.

Figure 11A:
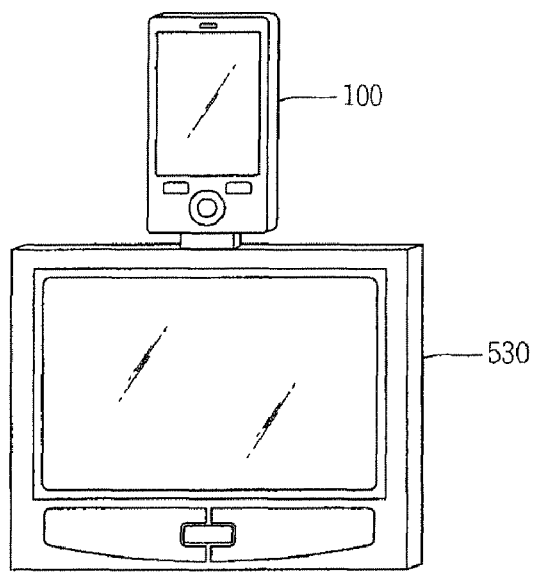
FIGS. 11A and 11B illustrate a mobile terminal with a touch pad module mounted thereon according to an embodiment of the present invention.
Figure 11B:
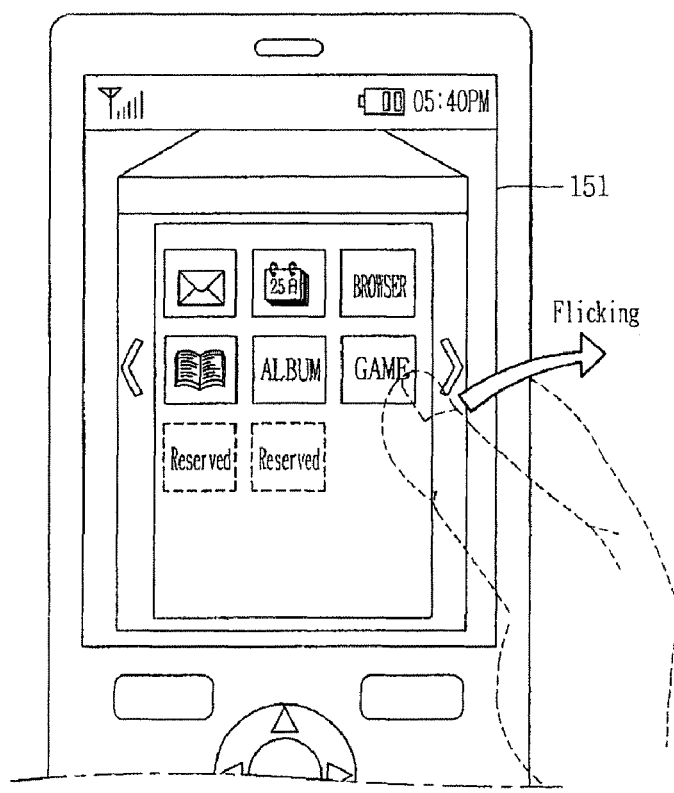

FIG. 11A illustrates the mobile terminal 100 with a touch pad module 530 mounted thereon. Referring to FIGS. 11A and 11B, when an electrical signal is applied through a connection of the connector 400, the controller 180 recognizes that a module has been mounted on the mobile terminal 100 and the mounted module is the touch pad module 530.

When functions of the mounted module are confirmed, the controller 180 displays the UI of the triangular prism, the UI displaying execution icons for the functions such as a message service, a calendar, a browser, a phone book, a camera album, GAME, and the like as the menu items of the touch pad module 530, as shown in FIG. 11B. As for the arrangement order of the execution icons, preferably, the execution icons are sequentially arranged according to their use frequency, starting from the most frequently used execution icon. The UI according to an embodiment of the present invention may move the current menu to a next item or a previous item as illustrated in FIG. 8 by flicking, or a particular key input or a software button.

Figure 12A:
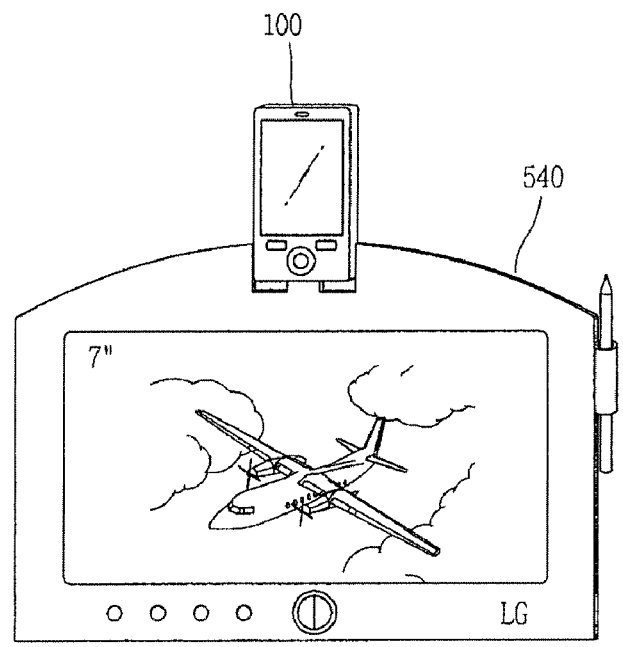
FIGS. 12A and 12B illustrate a mobile terminal with a display extension module mounted thereon according to an embodiment of the present invention.
Figure 12B:
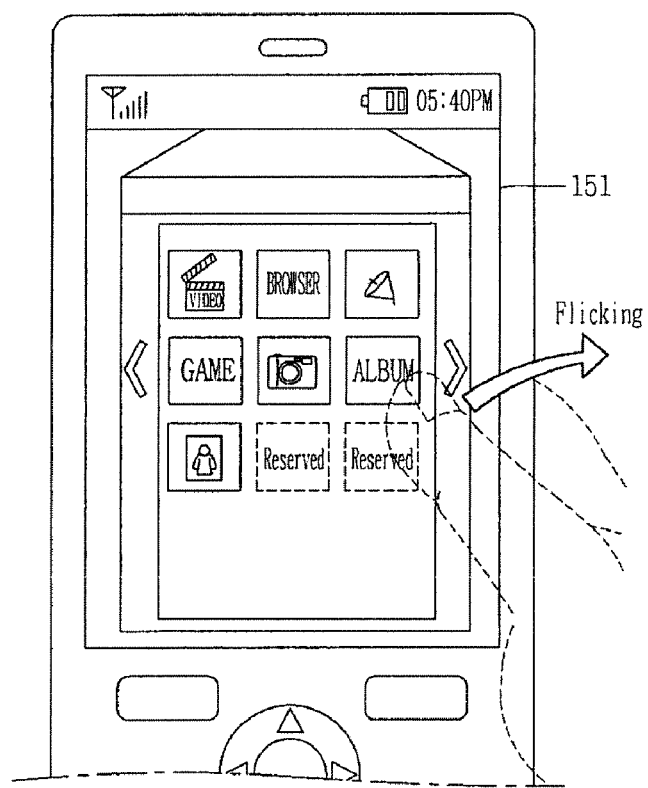

FIG. 12A illustrates the mobile terminal 100 with the display extension module 540 mounted thereon. Referring to FIGS. 12A and 12B, when a module mounted via the connector 400 is checked to be the display extension module 540, the controller 180 displays execution icons for the functions requiring an image output such as video play, a browser, a video call, a broadcast viewing, GAME, a camera, an album, and the like as the menu items of the display extension module 540, as shown in FIG. 12B.

In the menu screen image, as shown in FIG. 12B, when the user selects one execution icon and a function corresponding to the selected execution icon is executed, the controller 180 differently controls displaying of the mobile terminal 100 and the display extension module 540. Namely, the controller 180 maintains the menu screen image of FIG. 12B on the display unit 151 of the mobile terminal 100 and controls the display extension module 540 to output an execution screen image of the function. The display extension module 540, a display device that can output a screen image of the mobile terminal 100, may include a PC monitor, a television monitor, and the like.

Figure 13A:
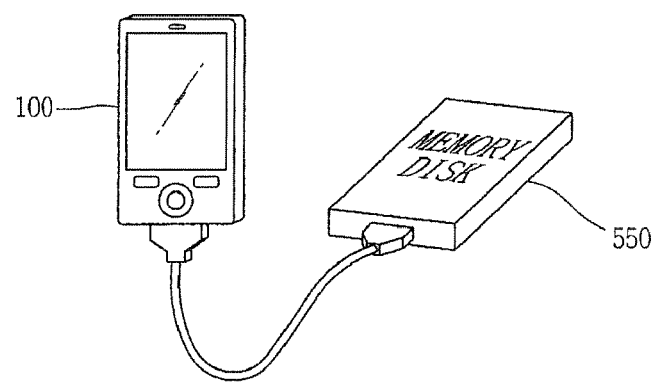
FIGS. 13A and 13B illustrate managing a menu according to an embodiment of the present invention.
Figure 13B:
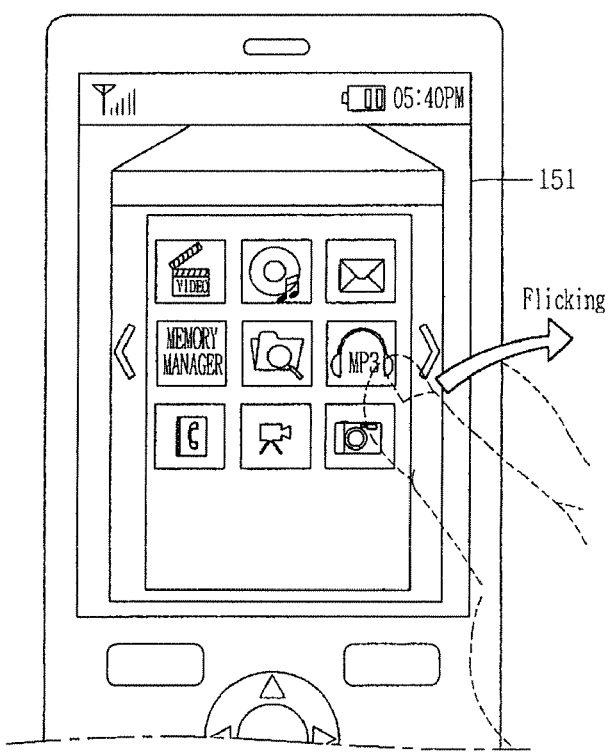

FIG. 13A illustrates the mobile terminal 100 with the memory extension module 550 mounted thereon. Referring to FIGS. 13A and 13B, when a module mounted via the connector 400 is determined to be the memory extension module 550, such as a large capacity external hard disk, PC, or the like, the controller 180 displays execution icons for various contents, such as video (for example, a broadcast, movie, captured video, and the like), images (for example, an album, a captured image, a background image, and the like), music (for example, reception bell sound, mp3, and the like), text (for example, a phone book, a message, and the like), GAME, and the like, storage box, a file searcher, a memory manager, and the like, as the menu items of the memory extension module 550, as shown in FIG. 13B.

In this embodiment, the controller 180 may execute an additional application for performing copying, moving, deleting, and the like, of data between the memory extension module 550 and the mobile terminal 100 while displaying the execution icons. The user may perform data transmission or backup between the memory extension module 550 and the mobile terminal 100 through the additional application.

Figure 14A:
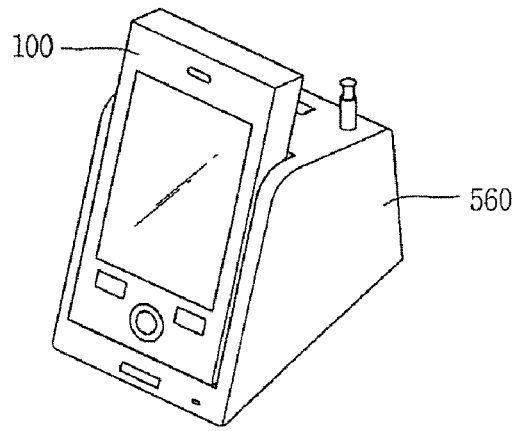
FIGS. 14A to 14C illustrate a mobile terminal with a communication module mounted thereon according to an embodiment of the present invention.
Figure 14B:
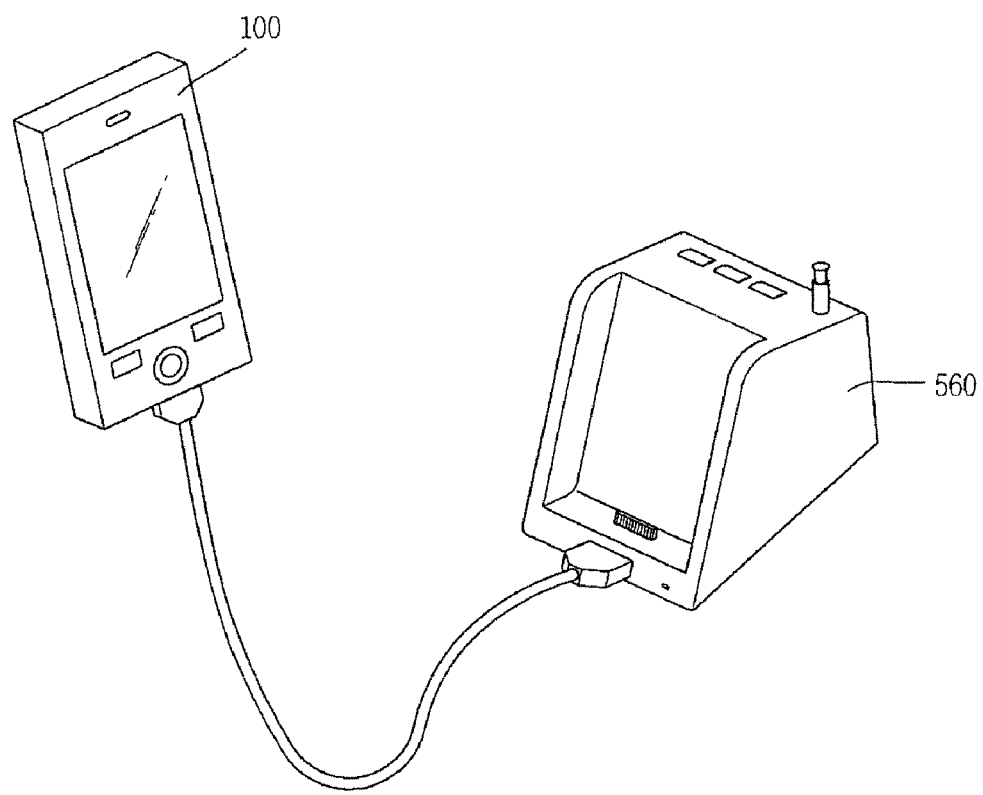
Figure 14C:
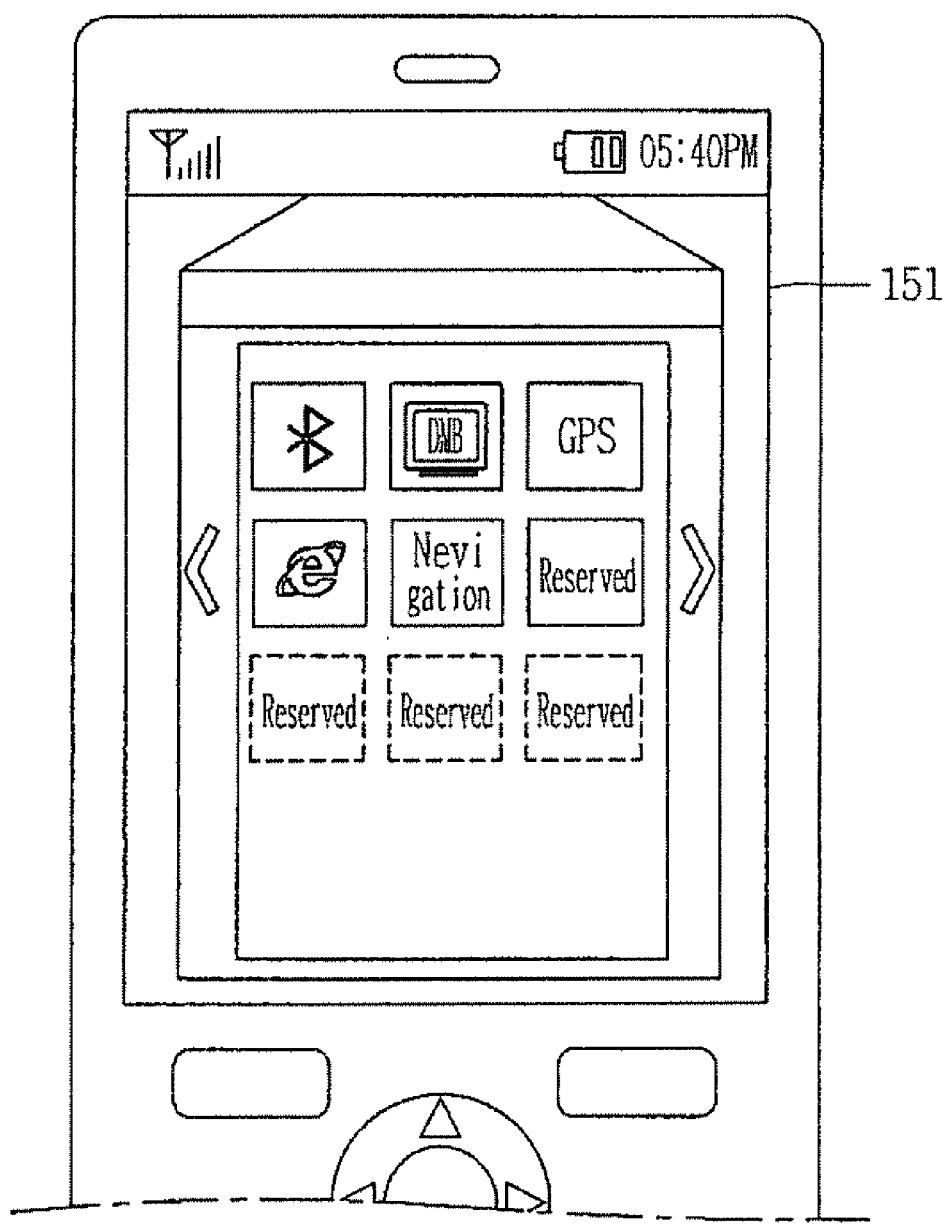

FIGS. 14A to 14C illustrate the mobile terminal 100 with a communication module 560 mounted thereon. Referring to FIGS. 14A to 14C, when a module mounted via the connector 400 is checked to be the communication extension module 560, the controller 180 displays execution icons for communication functions such as Bluetooth™, Infrared Data Association (IrDA), wireless Internet, call communication (voice, message), and broadcast services as the menu items of the communication extension module 560, as shown in FIG. 14C.

When the communication module 560 is connected with the mobile terminal 100, it improves reception or transmission performance of various signals, such as broadcast (terrestrial, satellite) signals, GPS signals, short-range communication (for example, Bluetooth™, IrDA) signals, mobile communication signals, wireless Internet signals, and the like. For example, the broadcast reception rate of the mobile terminal 100 can be increased by driving a mounted broadcast signal receiver, such as an antenna module or the like, for improved performance.

In addition, functions, such as navigation, analog broadcast reception, and the like, not mounted at the mobile terminal 100 can be provided. The communication module 560 may have a geographic information system (GIS) device for providing geographical information and supplement a GPS signal reception performance of the mobile terminal 100 to provide a navigation function. The communication module 560 may include an analog broadcast reception device to receive a skywave TV broadcast and radio broadcast, and provide the same to users.

In the above description, the keyboard function extension module 510, the portable speaker module 520, the touch pad module 530, the display extension module 540, the memory extension module 550, and the communication module 560 are discussed but these are merely illustrative and function extension modules or accessory modules extending the existing function of the mobile terminal 100 such as a gamer module, a camera function extension module, and the like, may be additionally mounted at the mobile terminal.

Figure 15A:
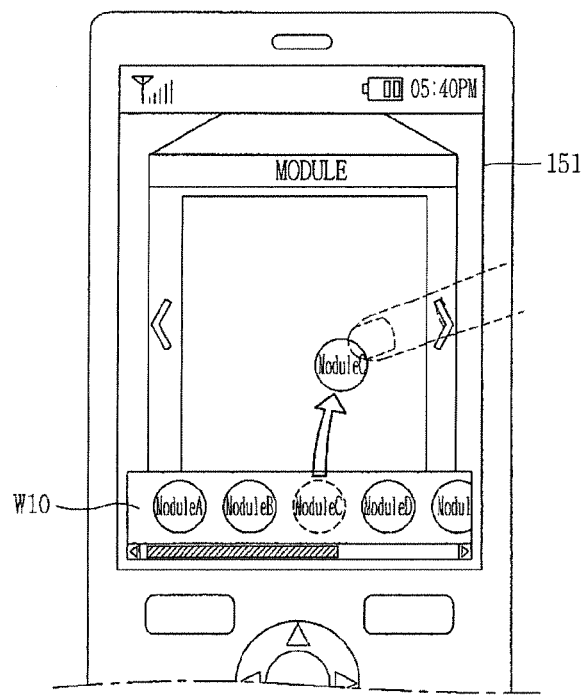
FIGS. 15A and 15B illustrate managing a menu according to an embodiment of the present invention.
Figure 15B:
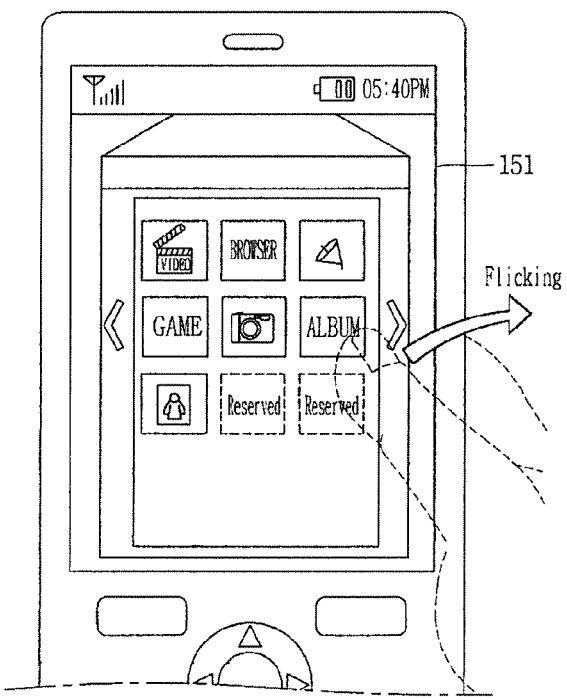

FIGS. 15A and 15B illustrate managing a menu according to an embodiment of the present invention to inform which module has been mounted by the user. In this embodiment, when the controller 180 detects that a module 500 is mounted, it displays a module select window W10 on the display 151, as shown in FIG. 15A, and waits for a user selection.

The user selects a module C (for example, a display extension module) in such a manner of moving, by key input or touch input, an icon of the module into a module menu box through the displayed module select window W10. Through such user selection, the controller 180 recognizes that the module C has been mounted.

Recognizing the mounted display extension module according to the selection of the module C, the controller 180 displays execution icons for functions requiring an image output, such as video play, browser, video call, broadcast viewing, GAME, camera, album, and the like, as the menu items of the display extension module, as shown in FIG. 15B. Displaying of the execution icons by the UI is performed in the same manner as that of the above described embodiment.

Icons of the keyboard extension module, the portable speaker module, the touch pad module, the display extension module, the memory extension module, and the communication module are displayed on the module select window W10. Further, icons of other mountable modules, such as a gamer module, a camera function extension module, and the like, may be added according to settings of the mobile terminal 100.

Figure 16:
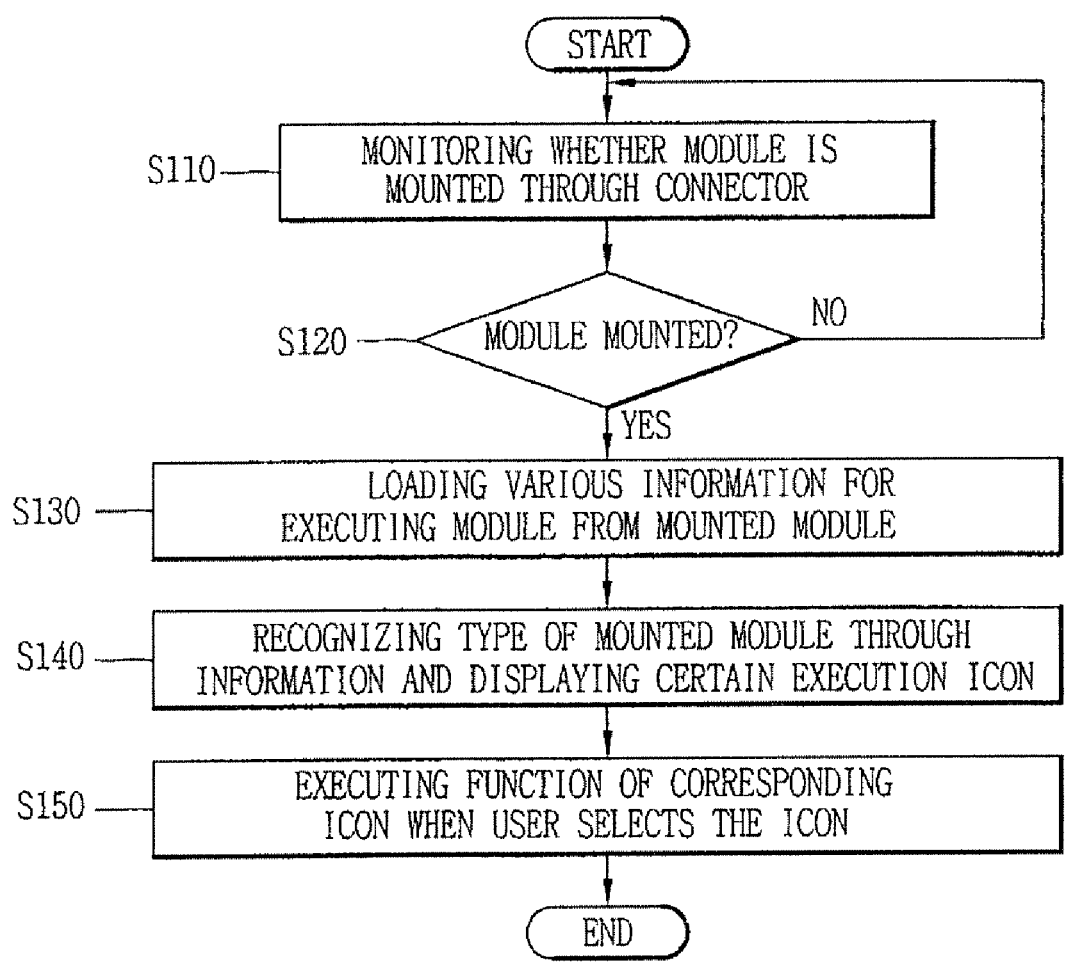
FIG. 16 is a flow chart illustrating managing a menu according to an embodiment of the present invention.

FIG. 16 is a flow chart illustrating managing a menu according to an embodiment of the present invention. Referring to FIG. 16, when the external module, such as the keyboard function extension module, the portable speaker module, the touch pad module, the display extension module, the communication module, the memory extension module, the gamer module, the camera function extension module, and the like, is mounted, the mobile terminal 100 may load various information required for execution from the mounted module and control the module according to the information.

In this embodiment, when a module 500 is mounted (S110, S120), the controller 180 accesses a memory of the corresponding module and loads various information for executing the module (S130). Subsequently, the controller 180 recognizes a type of the module based on the loaded information and displays certain execution icons at the menu items or standby screen of the module 500 (S140). When the user selects one of the execution icons, the controller 180 executes a function corresponding to the selected execution icon (S150).

In this embodiment, when the mobile terminal 100 is connected to a module 500, it can load various information from the module to thereby reduce the burden of terminal resources. According to the various embodiments of the present invention described above, the menu or UI management can be implemented as codes that can be read by a computer in a program-recorded medium. The computer-readable medium may include any types of recording devices storing data that can be read by a computer system.

Figure 17:
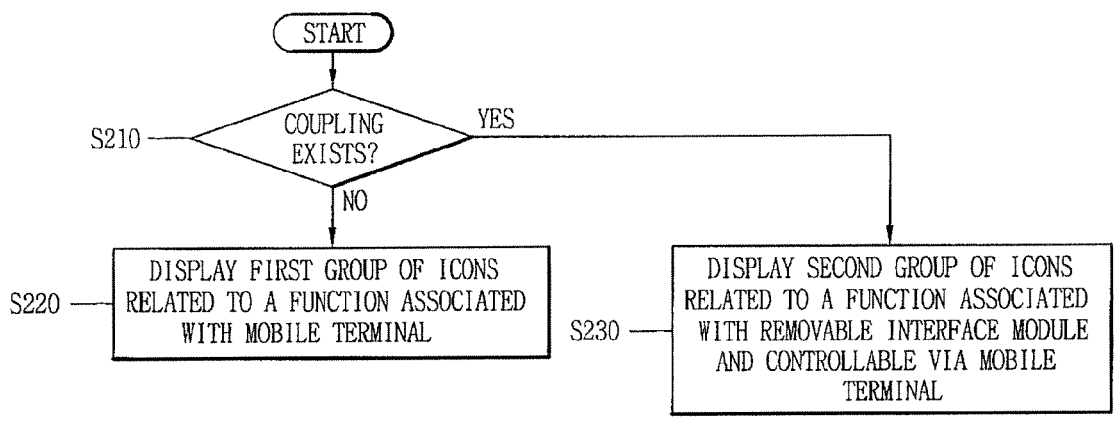
FIG. 17 is a flow chart illustrating displaying items on a mobile terminal according to an embodiment of the present invention.

FIG. 17 is a flow chart illustrating displaying items on a mobile terminal according to an embodiment of the present invention. Referring to FIG. 17, the mobile terminal 100 displays a first group of icons on a touchscreen display when no removable interface module 500 is coupled to the mobile terminal (S210, S220) and each of the first group of icons relates to a function that is associated with the mobile terminal and are controllable responsive to user input to the touchscreen display. When the removable interface module 500 is coupled to the mobile terminal 100, the mobile terminal displays a second group of icons on the touchscreen display (S210, S230) and each of the second group of icons relates to a function that is associated with the removable interface module and are controllable responsive to user input to the touchscreen display.

The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals, for example, transmission via the Internet. The computer may include the controller 180 of the mobile terminal 100.

As presented herein, the external modules are mounted at the mobile terminal to overcome limitation of the hardware or software resources and extends the function and performance. The modules mounted at the mobile terminal are recognized and functions related to the mounted modules are automatically displayed on the display screen of the mobile terminal, and thus, the user can conveniently execute the functions related to the corresponding modules.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying items on a mobile terminal, the method comprising:
    detecting whether a user-removable interface module is connected to the mobile terminal;
    displaying a first group of icons on a touchscreen display of the mobile terminal when it is detected that the user-removable interface module is not connected to the mobile terminal, wherein each of the first group of icons relates to a function that is associated with the mobile terminal and is controllable responsive to user input to the touchscreen display;
    displaying a second group of icons on the touchscreen display of the mobile terminal when it is detected that the user-removable interface module is connected to the mobile terminal, wherein each of the second group of icons relates to a function of the mobile terminal that is associated with the user-removable interface module and is controllable responsive to user input to the touchscreen display;
    executing at least one function corresponding to a selected at least one icon of the second group of icons, wherein the executing is responsive to the selecting of the at least one icon; and
    controlling the user-removable interface module to output an execution screen image related to the at least one function.

2. The method according to claim 1, further comprising:
    displaying the second group of icons in an order based upon a user's frequency of use of a function related to the second group of icons.

3. The method according to claim 1, further comprising:
    displaying the first group of icons on an idle screen of the touchscreen display.

4. The method according to claim 1, wherein the first group of icons define a first menu and the second group of icons define a second menu, method further comprising:
    displaying the first menu only when it is detected that the user-removable interface module is not connected to the mobile terminal; and displaying the second menu only when it is detected that the user-removable interface module is connected to the mobile terminal.

5. The method according to claim 1, wherein the first group of icons define a first menu and the second group of icons define a second menu, the method further comprising:
switching between the displaying of the first menu and the displaying of the second menu based upon whether it is detected that the user-removable interface module is connected to the mobile terminal.

6. The method according to claim 1, further comprising:
automatically displaying the second group of icons responsive to the detecting that the user-removable interface module is connected to the mobile terminal.

7. The method according to claim 1, wherein each function related to the first group of icons is different from each function related to the second group of icons.

8. The method according to claim 1, further comprising:
ceasing the displaying of the first group of icons upon detecting that the user-removable interface module is connected to the mobile terminal.

9. A mobile terminal, comprising:
a connector configured to connect to a user-removable interface module;
a controller configured to detect whether the user-removable interface module is connected to the mobile terminal; and
a touchscreen display configured to display a first group of icons responsive to the detecting that the user-removable interface module is not connected to the mobile terminal and to display a second group of icons responsive to the detecting that the user-removable interface module is connected to the mobile terminal,
wherein each of the first group of icons relates to a function that is associated with the mobile terminal and is controllable responsive to user input to the touchscreen display,
wherein each of the second group of icons relates to a function of the mobile terminal that is associated with the user-removable interface module and is controllable responsive to user input to the touchscreen display,
wherein the controller is further configured to control the user-removable interface module to output an execution screen image related to at least one function corresponding to a selected at least one icon of the second group of icons when the at least one function is executed responsive to the selection of the at least one icon.

10. The mobile terminal according to claim 9, wherein the touchscreen display is further configured to display the second group of icons in an order based upon a user's frequency of use of a function related to the second group of icons.

11. The mobile terminal according to claim 9, wherein the touchscreen display is further configured to display the first group of icons on an idle screen of the touchscreen display.

12. The mobile terminal according to claim 9, wherein:
the first group of icons define a first menu and the second group of icons define a second menu; and
the touchscreen display is further configured to display the first menu only when the controller detects that the user-removable interface module is not connected to the mobile terminal and to display the second menu only when the controller detects that the user-removable interface module is connected to the mobile terminal.

13. The mobile terminal according to claim 9, wherein:
the first group of icons define a first menu and the second group of icons define a second menu; and the touchscreen display is further configured to switch between the displaying of the first menu and the displaying of the second menu based upon whether the controller detects that the user-removable interface module is connected to the mobile terminal.

14. The mobile terminal according to claim 9, wherein the touchscreen display is further configured to display the second group of icons automatically when the controller detects that the user-removable interface module is connected to the mobile terminal.

15. The mobile terminal according to claim 9, wherein each function related to the first group of icons is different from each function related to the second group of icons.

16. The mobile terminal according to claim 9, wherein the touchscreen display is further configured to cease the displaying of the first group of icons when the controller detects that the user-removable interface module is connected to the mobile terminal.

17. A method for displaying at least one item on a mobile terminal, the method comprising:
detecting whether a user-removable interface module is connected to the mobile terminal;
determining a type of the user-removable interface module upon detecting that the user-removable interface module is connected to the mobile terminal;
displaying the at least one item on a touchscreen display of the mobile terminal responsive to the determined type of the user-removable interface module, wherein each of the at least one item relates to a corresponding at least one function of the mobile terminal that is associated with the determined type of the user-removable interface module;
executing at least one function corresponding to a selected item of the at least one item; and
controlling the user-removable interface module to output an execution screen image related to the at least one function,
wherein the displayed at least one item is different for different types of user-removable interface modules.

18. The method according to claim 17, further comprising:
controlling the at least one item related to the at least one function responsive to user input to the touchscreen display.

19. The method according to claim 18, further comprising:
transmitting a signal generated responsive to the controlling the at least one item to the connected user-removable interface module.

20. The method according to claim 19, further comprising:
outputting the signal via the connected user-removable interface module.

21. A method for displaying items on a mobile terminal, the method comprising:
detecting whether a user-removable interface module is connected to the mobile terminal or not;
displaying a first group of icons on a touchscreen display of the mobile terminal when the user-removable interface module is not connected to the mobile terminal, wherein each of the first group of icons relates to a function that is associated with the mobile terminal and which are each controllable responsive to user input to the touchscreen display;
displaying a second group of icons on a limited area of the touchscreen display of the mobile terminal when the user-removable interface module is connected to the mobile terminal, wherein each of the second group of icons relates to a function of the mobile terminal that is associated with the user-removable interface module and which are each controllable responsive to user input to the touchscreen display; and scrolling the second group of icons in the limited area responsive to user input to the touchscreen display.

22. The method according to claim 21, further comprising:

displaying the second group of icons in an order based upon a user's frequency of use of a function related to the second group of icons.

23. The method according to claim 21, wherein the first group of icons define a first menu and the second group of icons define a second menu, and wherein the method further comprises:

displaying the first menu only when the user-removable interface module does not connect to the mobile terminal; and displaying the second menu only when the user-removable interface module is connected to the mobile terminal.

24. The method according to claim 21, wherein the first group of icons define a first menu and the second group of icons define a second menu, and wherein the method further comprises:

switching between the displaying of the first menu and the displaying of the second menu based upon whether the user-removable interface module is connected to the mobile terminal.

* * * * *